(12) United States Patent
Zhou et al.

(10) Patent No.: US 9,042,533 B2
(45) Date of Patent: May 26, 2015

(54) DUAL-CHANNEL ANALOG DOOR ENTRY SYSTEM AND A METHOD THEREOF

(75) Inventors: Dalin Zhou, Fujian (CN); Jinshu Chen, Fujian (CN); Xiaoping Zhou, Fujian (CN); Yangpeng Zhang, Fujian (CN)

(73) Assignee: ABB Technology Ltd., Zurich (CH)

(*) Notice: Subject to any disclaimer, the term of this patent is extended or adjusted under 35 U.S.C. 154(b) by 0 days.

(21) Appl. No.: 14/348,245

(22) PCT Filed: Apr. 25, 2012

(86) PCT No.: PCT/CN2012/074668
§ 371 (c)(1),
(2), (4) Date: Mar. 28, 2014

(87) PCT Pub. No.: WO2013/159292
PCT Pub. Date: Oct. 31, 2013

(65) Prior Publication Data
US 2014/0241516 A1 Aug. 28, 2014

(51) Int. Cl.
*H04M 1/60* (2006.01)
*H04M 11/02* (2006.01)
*H04B 3/54* (2006.01)
*H04N 7/18* (2006.01)

(52) U.S. Cl.
CPC ............ *H04M 11/025* (2013.01); *H04B 3/548* (2013.01); *H04N 7/186* (2013.01)

(58) Field of Classification Search
USPC ......................................... 379/159; 375/222
See application file for complete search history.

(56) References Cited

U.S. PATENT DOCUMENTS

2010/0260247 A1* 10/2010 Albiston et al. .............. 375/222

FOREIGN PATENT DOCUMENTS

| CN | 201185459 Y | 1/2009 |
| CN | 201657232 U | 11/2010 |
| KR | 10-2006-0117603 A | 11/2006 |

OTHER PUBLICATIONS

ISA/CN International Search Report issued Jan. 31, 2013 re PCT Application No. PCT/CN2012/074668, filed Apr. 25, 2012.

* cited by examiner

*Primary Examiner* — Creighton Smith
(74) *Attorney, Agent, or Firm* — Robert A. Jefferis; Driggs, Hogg, Daugherty & Del Zoppo Co., LPA

(57) ABSTRACT

The present invention discloses a dual-channel analog door entry system and a method thereof. The dual-channel analog door entry system comprises two cables connected between the building gateway and the floor distributors, configured to transmit audio and/or video signals between the outdoor stations and indoor phones; the building gateway, configured to receive a call request from at least one of the outdoor stations, identify and assign an available cable as an intercom channel, send the call request to each of the floor distributors via the intercom channel, and switch the audio and/or video signals from the outdoor station to the available cable; at least one of floor distributors, configured to receive and forward the call request to a desired indoor phone, receive a call response from the desired indoor phone if the desired indoor phone is available, and switch the audio and/or video signals from the available cable to the desired indoor phone. The solutions of the present invention achieves great improvement on line busy probability for large buildings and communities; and the solution is smart and simple to implement with low additional cost for reconstruction.

20 Claims, 5 Drawing Sheets

DUAL-CHANNEL ANALOG DOOR ENTRY SYSTEM AND A METHOD THEREOF

RELATED APPLICATION

This application is a national filing of PCT application Ser. No. PCT/CN 2012/074668, filed Apr. 25, 2012.

FIELD OF THE INVENTION

The invention relates to the door entry system or intercom system technical field, and more particularly to a dual-channel analog door entry system and a method thereof.

BACKGROUND OF THE INVENTION

In prior art, most analog door entry systems are single-channel systems, each of which uses a Cat.5 or Cat.5e cable with 4 twisted pairs for transmitting the power supply, audio, video and data signals respectively. Therefore, the intercom function of door entry systems is realized based on the single channel.

There are more and more high-rise residential buildings and communities appearing with multiple entrances in cities. When a single-channel analog door entry system is implemented for such buildings or communities, due to a large quantity of users, the users will frequently encounter the "line is occupied" or "line is busy" issues and wait until the line is available or released, otherwise try it next time. The issue of "line is busy" is caused by the simultaneous intercoms among other users at that moment, for example, between another outdoor station and an indoor phone. It's obvious to degrade the efficiency of the intercom system and customers' satisfaction.

Due to the above mentioned problems, the present invention is to propose a dual-channel analog door entry system and a method thereof.

SUMMARY OF THE INVENTION

The main object of the present invention is to reduce probability of "line is busy" especially for the high-rise and multi-entrance residential building or community. Hence, the present invention provides a dual-channel analog door entry system and a method thereof.

According to an aspect of the present invention, it provides a dual-channel analog door entry system. The dual-channel analog door entry system comprises: a building gateway connected between at least one of outdoor stations and at least one of floor distributors via two cables, configured to receive a call request from at least one of the outdoor stations, identify and assign an available cable as an intercom channel, send the call request to each of the floor distributors via the intercom channel, and switch the audio and/or video signals from the outdoor station to the available cable; at least one of floor distributors, each of which is connected with at least one of indoor phones, configured to receive and forward the call request to a desired indoor phone, receive a call response from the desired indoor phone if the desired indoor phone is available, and switch the audio and/or video signals from the available cable to the desired indoor phone; and two cables connected between the building gateway and the floor distributors, configured to transmit audio and/or video signals between the outdoor stations and indoor phones.

According to another preferred embodiment of the present invention, the building gateway is further configured to forward the call request to each floor distributor via the available cable; each floor distributor receives the call request and decodes the call request to get the target address for clarifying the relation between the target address and the floor distributor as well as indoor phone; and the target floor distributor sends the call request to the desired indoor phone.

According to another preferred embodiment of the present invention, the target floor distributor is further configured to forward the call response to the outdoor station via the building gateway.

According to another preferred embodiment of the present invention, the building gateway is further configured to receive a monitoring request from at least one of indoor phones via the corresponding floor distributor, identify and assign an available cable as an intercom channel, and forward a call request to the desired outdoor station.

According to another preferred embodiment of the present invention, the building gateway is configured to send a monitoring response to the target floor distributor if the desired outdoor station is available, and switch the audio and video signals from the available cable to the desired outdoor station.

According to another preferred embodiment of the present invention, the cable comprises 4 twisted pairs, which can be a Cat.5, Cat.5e, Cat.6 or other similar cable.

According to another preferred embodiment of the present invention, the door entry system further comprises other building gateways and/or a switch with two additional cables.

According to another preferred embodiment of the present invention, the switch is configured to serve as a system expansion module, which can be connected to a gate station, management unit and/or more building gateways.

According to another preferred embodiment of the present invention, the gate station is installed at the entrance of a community, which can initiate a call to any indoor phone or management unit in the system.

According to another preferred embodiment of the present invention, the management unit is installed in a management center, which can initiate a call to any indoor phone in the system and monitor any outdoor station or gate station in the system.

According to the other aspect of the present invention, it provides an intercom method for a dual-channel analog door entry system. The method comprises: judging whether there is at least one of available cables after receiving a call request message; assigning an available cable as an intercom channel; and establishing a communication path between an outdoor station and an indoor phone by transmitting audio and/or video signals via the available cable.

According to another preferred embodiment of the present invention, the method further comprises: receiving a call request from one of outdoor stations by a building gateway; identifying and assigning an available cable as an intercom channel; forwarding the call request to each floor distributor via the available cable; and decoding and sending the call request to the desired indoor phone by the target floor distributor.

According to another preferred embodiment of the present invention, the method further comprises: switching the audio and video signals from the outdoor station to the available cable after identifying and assigning an available cable as an intercom channel.

According to another preferred embodiment of the present invention, the method further comprises: sending a call response to the target floor distributor if the desired indoor phone is available; switching the audio and video signals from the available cable to the desired indoor phone by the target floor distributor; and forwarding the call response to the outdoor station via the building gateway.

According to another preferred embodiment of the present invention, the method further comprises: receiving a monitoring request from at least one of indoor phones via the corresponding floor distributor by the building gateway; identifying and assigning an available cable as an intercom channel; and forwarding a monitoring request to the desired outdoor station.

According to another preferred embodiment of the present invention, the method further comprises: sending a monitoring response to the target floor distributor if the desired outdoor station is available by the building gateway; and switching the audio and video signals from the available cable to the desired outdoor station.

Embodiments of the present invention provide a dual-channel analog door entry system and a method thereof, which achieves great improvement on line busy probability for large buildings and communities; and the solution is smart and simple to implement with low additional cost for reconstruction.

BRIEF DESCRIPTION OF THE DRAWINGS

The subject matter of the invention will be explained in more details in the following description with reference to preferred exemplary embodiments which are illustrated in the drawings, in which.

DETAILED DESCRIPTION OF PREFERRED EMBODIMENTS

Exemplary embodiments of the present invention are described in conjunction with the accompanying drawings hereinafter. For the sake of clarity and conciseness, not all the features of actual implementations are described in the specification.

Figure 1:
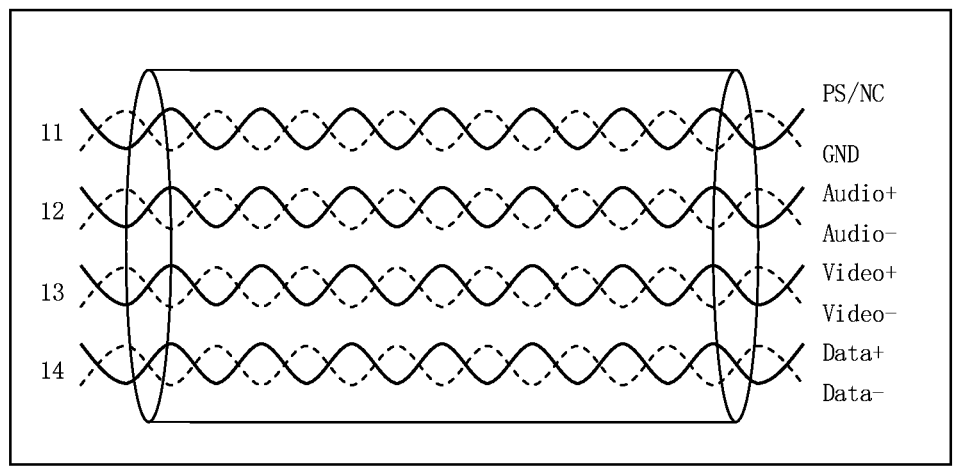
FIG. 1 illustrates a Cat.5 or Cat.5e cable with 4 twisted-pairs according to an embodiment of the present invention.

FIG. 1 illustrates a Cat.5 or Cat.5e cable with 4 twisted-pairs according to an embodiment of the present invention.

As shown in FIG. 1, the cable is used to transit power supply, audio, video and data signals respectively, in which, the first twisted-pair 11 is to transmit the power supply to the connected devices; so a wire in the first pair is named as "PS (power supply)/NC (unconnected)", the other is as "GND". In detail, when the devices connected to the cable is powered by a local power supply, which means it doesn't need to connect the wire named "PS/NC". The second twisted-pair 12 is to transmit the duplex audio signal in the differential mode. A wire in the second pair 12 is named as "audio+", and the other is as "audio-". The third twisted-pair 13 is to transmit the video signal in the differential mode. A wire in the third pair 13 is named as "video+", and the other is as "video-". The fourth twisted-pair 14, e.g. RS-485 or CAN is to transmit the duplex data signal in the differential mode. A wire in the fourth pair is named as "data+", and the other is as "data-".

Figure 2:
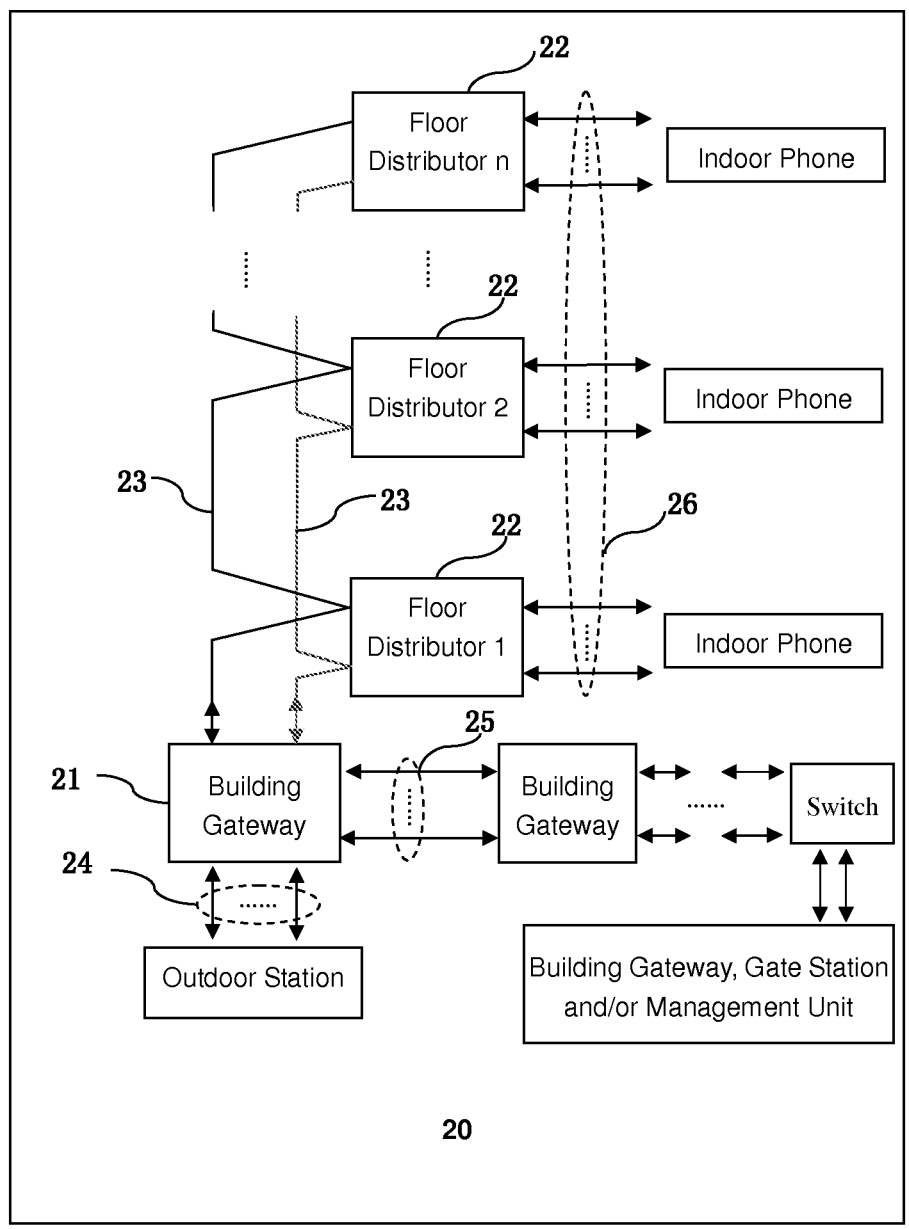
FIG. 2 illustrates a diagram of the dual-channel analog door entry system according to a preferred embodiment of the present invention.

FIG. 2 illustrates a diagram of the dual-channel analog door entry system according to a preferred embodiment of the present invention.

As shown in FIG. 2, the dual-channel analog door entry system 20 comprises: a building gateway 21, at least one of floor distributors 22 and two cables 23 connected between the building gateway 21 and the floor distributors 22, which are configured to transmit audio and/or video signals between the outdoor stations and indoor phones.

The building gateway 21 is connected between at least one of outdoor stations and at least one of floor distributors via two cables and configured to receive a call request from at least one of the outdoor stations, identify and assign an available cable as an intercom channel, send the call request to each of the floor distributors via the intercom channel, and switch the audio and/or video signals from the outdoor station to the available cable.

Each of the floor distributors 22 is connected with at least one of indoor phones, configured to receive and forward the call request to a desired indoor phone, receive a call response from the desired indoor phone if the desired indoor phone is available, and switch the audio and/or video signals from the available cable to the desired indoor phone.

Compared with the single-channel intercom system, the dual-channel analog door entry system has two cables 23, both of which have 4 twisted-pairs. The 2 cables 23 are managed by the building gateway 21. Any application needs a cable, the initiator should send out a command. After receiving the command, the building gateway 21 will assign an available cable for the application. In practice, the cable can be a Cat.5, Cat.5e, Cat.6 or other similar cable.

The building gateway 21 is further configured to forward the call request to each floor distributor 22 via the available cable 23; each floor distributor 22 receives the call request and decodes the call request to get the target address for clarifying the relation between the target address and the floor distributor as well as indoor phone; and the target floor distributor sends the call request to the desired indoor phone. The target floor distributor 22 is further configured to forward the call response to the outdoor station via the building gateway 21.

When a person wants to monitor and communicate with an outdoor station, a monitoring request can be sent by indoor phone. And then the building gateway 21 receives the monitoring request from at least one of indoor phones via the corresponding floor distributor 22, identifies and assigns an available cable as an intercom channel, and forwards the call request to the desired outdoor station. If the desired outdoor station is available, the building gateway 21 is configured to send a monitoring response to the target floor distributor 22, and switch the audio and video signals from the available cable to the desired outdoor station.

According to an embodiment of the present invention, the door entry system 20 further comprises other building gateways and/or a switch with two additional cables, in which the switch is configured to serve as a system expansion module, which can be connected to a gate station, management unit and/or more building gateways. The gate station is installed at the entrance of a community, which can initiate a call to any indoor phone or management unit in the system; and the management unit is installed in a management center, which can initiate a call to any indoor phone in the system and monitor any outdoor station or gate station in the system.

Figure 3:
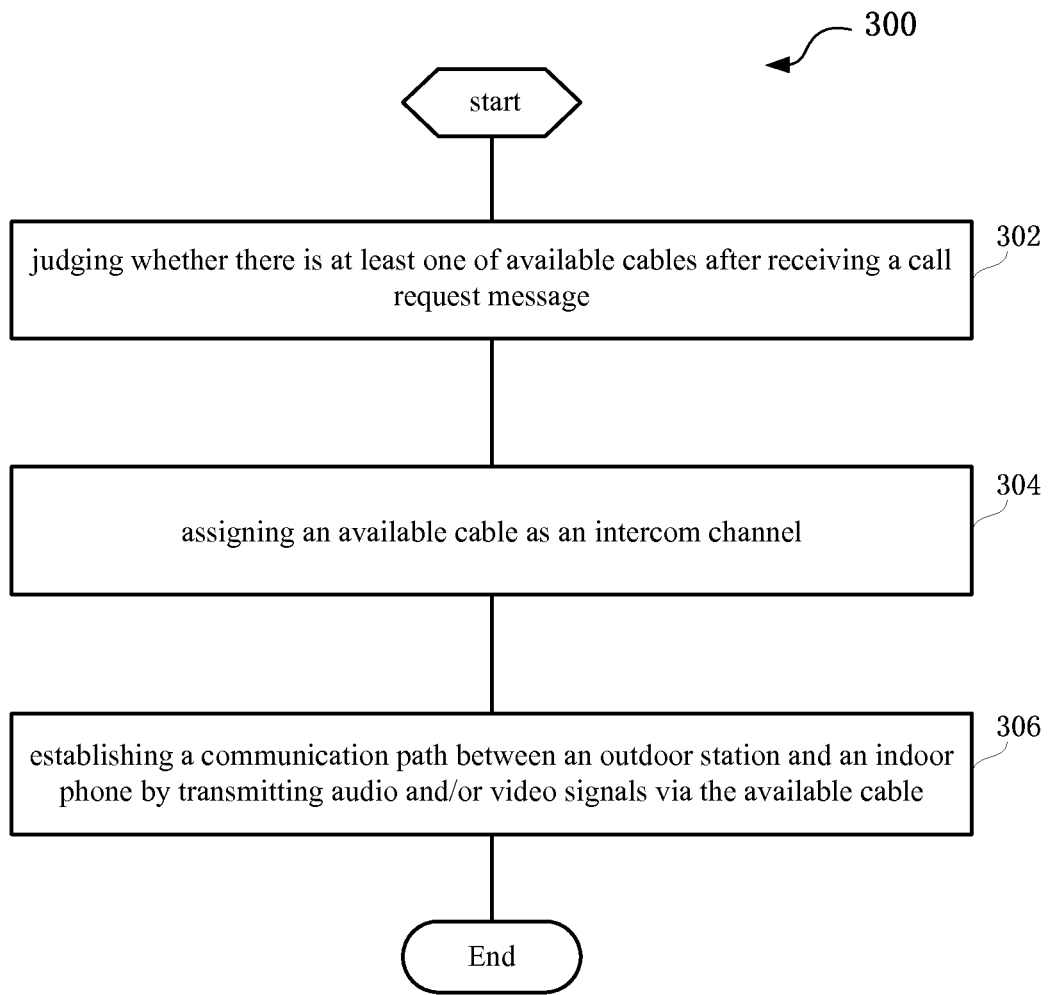
FIG. 3 illustrates a flow chart of an intercom method for a dual-channel analog door entry system according to an embodiment of the present invention.

FIG. 3 illustrates a flow chart of an intercom method for a dual-channel analog door entry system according to an embodiment of the present invention.

As shown in FIG. 3, the intercom method comprises the following steps:

Step 302, judging whether there is at least one of available cables after receiving a call request message. After receiving a call request from one of outdoor stations, the building gateway judges whether there is at least one of available cables after receiving a call request message.

Step 304, assigning an available cable as an intercom channel. After the building gateway identifies an available cable, the available cable is assigned as an intercom channel.

Step 306, establishing a communication path between an outdoor station and an indoor phone by transmitting audio and/or video signals via the available cable. According to a preferred embodiment, the building gateway forwards the call request to each floor distributor via the available cable; and the floor distributor decodes and sends the call request to the desired indoor phone by the target floor distributor.

Figure 4:
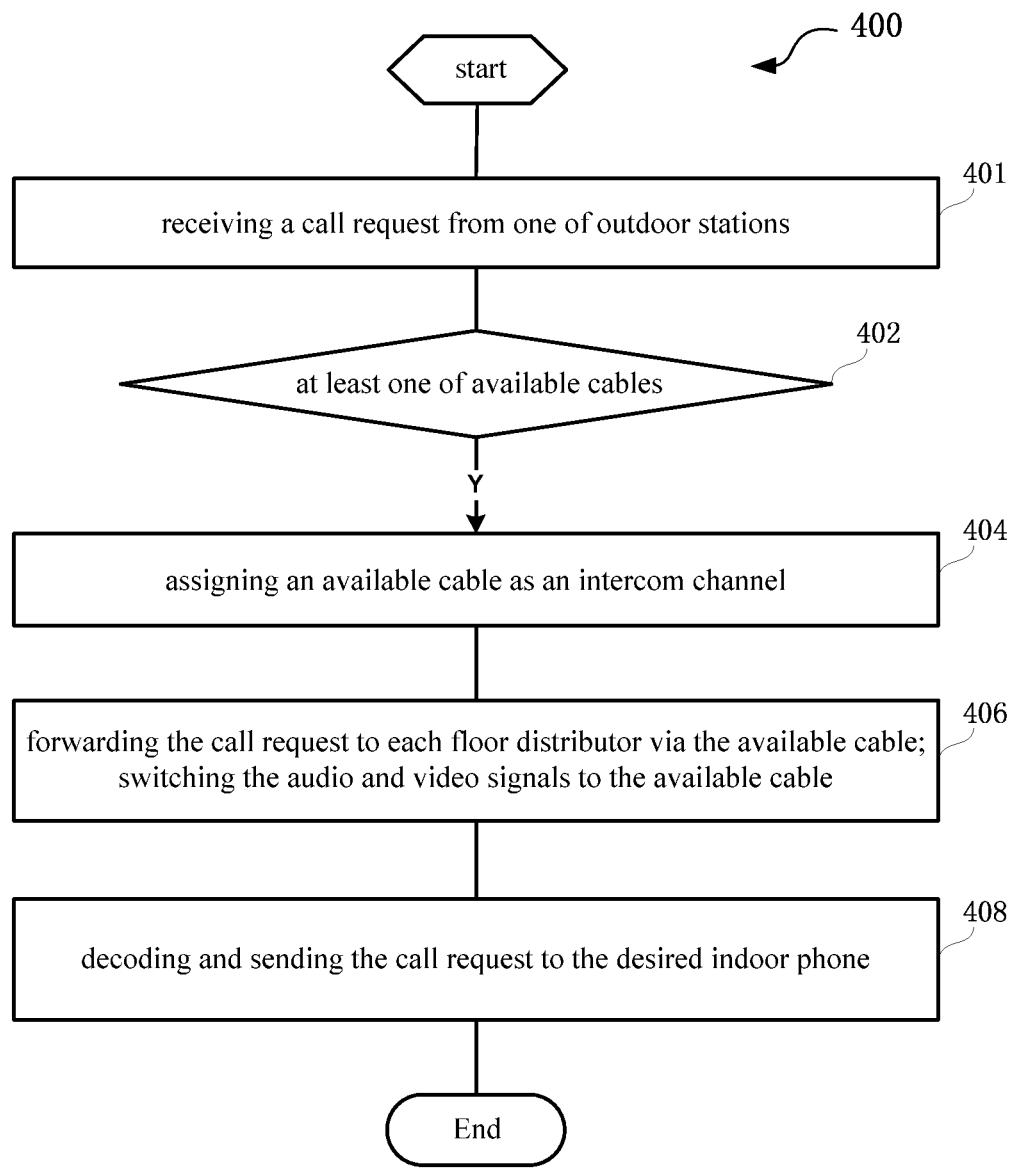
FIG. 4 illustrates a flow chart of an intercom method for a dual-channel analog door entry system according to another embodiment of the present invention.

FIG. 4 illustrates a flow chart of an intercom method for a dual-channel analog door entry system according to another embodiment of the present invention.

As shown in FIG. 4, the intercom method 400 comprises the following steps:

Step 401, the building gateway receives a call request from one of outdoor stations.

Step 402, the building gateway judges whether there is at least one of available cables. If there is an available cable, go to step 404.

Step 404, the building gateway identifies an available cable which is assigned as an intercom channel.

Step 406, the building gateway forwards the call request to each floor distributor via the available cable and switches the audio and video signal to the available cable. The two sub-steps can be implemented simultaneously or in sequence.

Step 408, the floor distributor decodes and sends the call request to the desired indoor phone by the target floor distributor.

According to a preferred embodiment, the method further comprises: sending a call response to the target floor distributor if the desired indoor phone is available, then switching the audio and video signals from the available cable to the desired indoor phone by the target floor distributor; and forwarding the call response to the outdoor station via the building gateway.

In detail, when an outdoor station initiates a call to an indoor phone, it will send out a call request command to the building gateway 21 via the cable 24 which connects the building gateway 21 and the outdoor stations together. The call request command contains the source address of the outdoor station and the target address of the indoor phone. The building gateway 21 will search an available cable 23 and assign it for transmitting this call request, and switch the audio & video signals from the outdoor station to the assigned cable 23, and then repeat the request command via the assigned cable 23 to the floor distributors 22. All the floor distributors 22 will receive the repeated command and analyze it to get the target address. If one of the distributors finds the target address of the corresponding indoor phone is under itself, it will forward the command to the indoor phone via the cable 26. If the target indoor phone is available, it will send back a call response to the outdoor station with the original source address in the call request command. The call response contains the source address (of the target indoor phone) and the target address (of the original outdoor station). When the call response arrives, the floor distributor switches the audio & video signals from the assigned cable 23 to the cable 26 which is connected with the indoor phone, and also forwards the response to the building gateway 21. And then the building gateway 21 forwards the response to the right outdoor station according to the target address. Thus, a call path is established between the outdoor station and the indoor phone.

Based on the same way, the other call can be established between another outdoor station and another indoor phone at the same time.

It shall be noted that each side of the call can terminate the call by sending an ending call command to the other side. The command will be forwarded by the building gateway and the floor distributor. Then the other side will send back an ending call response. When the building gateway receives the response, it will switch off the audio & video signals from outdoor stations and release the assigned cable. When the floor distributor receives the response, it also switches off the audio & video signals from the assigned cable 23. Therefore, the call is terminated and the cable assigned for this call is also completely released.

Figure 5:
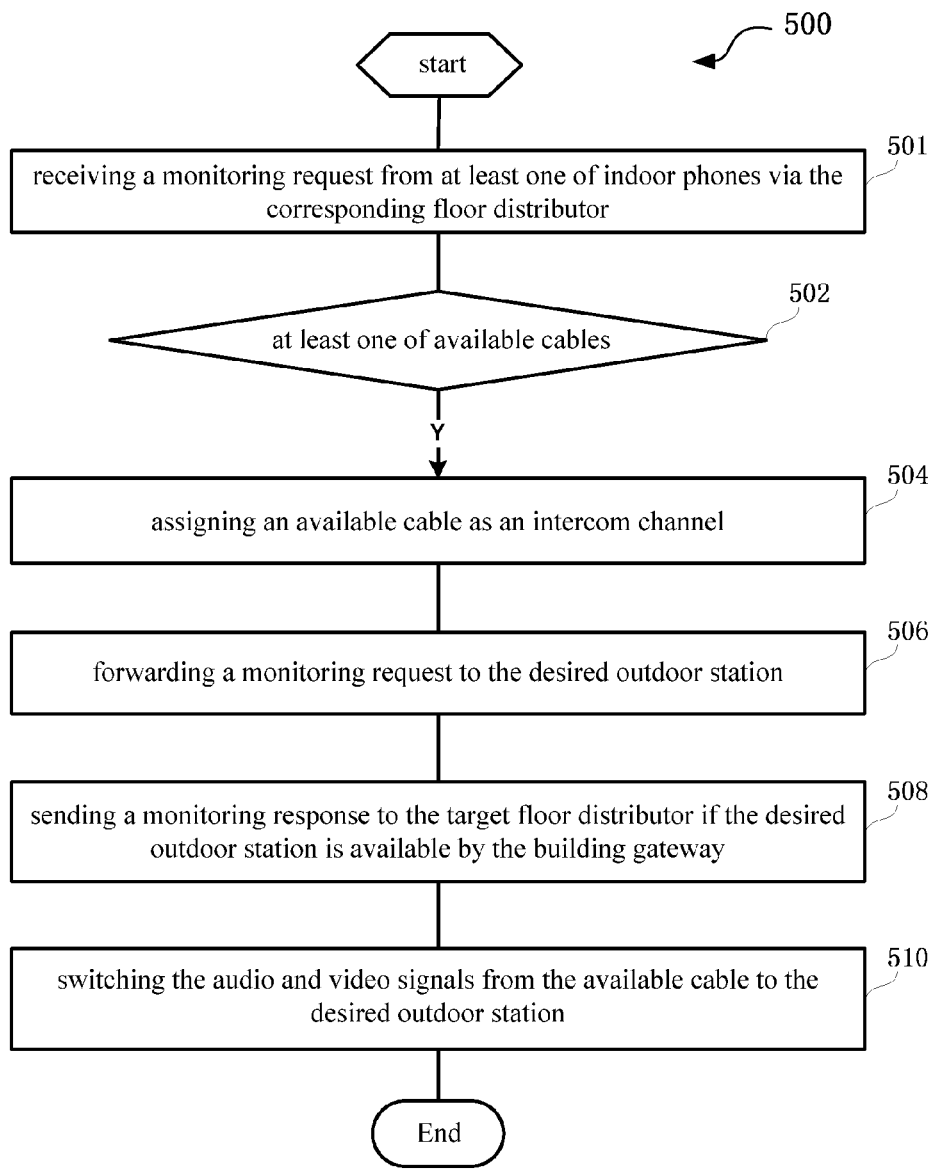
FIG. 5 illustrates a flow chart of an intercom method for a dual-channel analog door entry system according to another embodiment of the present invention.

FIG. 5 illustrates a flow chart of an intercom method for a dual-channel analog door entry system according to another embodiment of the present invention.

As shown in FIG. 5, the intercom method 500 comprises the following steps:

Step 501, receiving a monitoring request from at least one of indoor phones via the corresponding floor distributor by the building gateway;

Step 502, the building gateway judges whether there is at least one of available cables. If there is an available cable, go to step 504.

Step 504, the building gateway identifies an available cable which is assigned as an intercom channel.

Step 506, forwarding a monitoring request to the desired outdoor station.

Step 508, sending a monitoring response to the target floor distributor if the desired outdoor station is available by the building gateway; and Step 510, switching the audio and video signals from the available cable to the desired outdoor station.

Compared with the existing prior arts, the proposed solution of the present invention is suitable to implement in the high-rise and multi-entrance residential building or community; the line busy probability will be greatly reduced than the single-channel intercom system. Simultaneously, such method and dual-channel analog door entry system will greatly improve customers' satisfaction, and the cost for improvement is acceptable due to one more cable configured at vertical direction of the buildings.

Though the present invention has been described on the basis of some preferred embodiments, those skilled in the art should appreciate that those embodiments should by no means limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A dual-channel analog door entry system comprising:
a building gateway connected between at least one outdoor station and at least one floor distributor via two cables, wherein the building gateway receives a call request from the at least one outdoor station, identifies and assigns an available cable as an intercom channel, sends the call request to each of the at least one floor distributor via said intercom channel, and switches at least one of audio and video signals from the at least one outdoor station to the available cable; wherein each of the at least one floor distributor is connected with at least one indoor phone, wherein the at least one indoor phone receives and forwards the call request to a desired indoor phone of the at least one indoor phone, receives a call response from the desired indoor phone if the desired indoor phone is available, and switches the at least one of audio and video signals from the available cable to the desired indoor phone; wherein the two cables connect the building gateway and the at least one floor distributor, wherein the at least one floor distributor transmits the at least one of audio and video signals between the at least one outdoor station and the at least one indoor phone.

2. The door entry system according to claim 1, wherein the building gateway forwards the call request to each floor distributor via the available cable; each floor distributor receives the call request and decodes the call request to determine a target address that clarifies a relation between the target address, the floor distributor, and the indoor phone; wherein at least one target floor distributor sends the call request to the desired indoor phone.

3. The door entry system according to claim 1, wherein at least one target floor distributor forwards the call response to the outdoor station via the building gateway.

4. The door entry system according to claim 1, wherein the building gateway receives a monitoring request from the at least one indoor phone via one of the at least one floor distributor, identifies and assigns the available cable as an intercom channel, and forwards the monitoring request to a desired outdoor station of the at least one outdoor station.

5. The door entry system according to claim 4, wherein the building gateway sends a monitoring response to at least one target floor distributor if the desired outdoor station is available, and switches the at least one of audio and video signals from the available cable to the desired outdoor station.

6. The door entry system according to claim 1, wherein the available cable comprises four twisted pairs, wherein the cable is at least one of a Category 5, a Category 5e, and a Category 6.

7. The door entry system according to claim 1, wherein the door entry system further comprises at least one of other building gateways and a switch with two additional cables.

8. The door entry system according to claim 7, wherein the switch serves as a system expansion module connected to at least one of a gate station, a management unit, and the other building gateways.

9. The door entry system according to claim 8, wherein the gate station is installed at an entrance of a community, wherein the gate station initiates the call to the indoor phone or a management unit in the system.

10. The door entry system according to claim 8, wherein the management unit is installed in a management center, wherein the management center initiates the call to an indoor phone in the system and monitors at least one of an outdoor station in the system, and a gate station in the system.

11. An intercom method for a dual-channel analog door entry system, wherein the method comprises:
judging whether at least one cable is available after receiving a call request message;
assigning an available cable as an intercom channel; and
establishing a communication path between an outdoor station and an indoor phone by transmitting at least one of audio and video signals via the available cable.

12. The intercom method according to claim 11, wherein said method further comprises:
receiving a call request from the outdoor station by a building gateway;
identifying and assigning the available cable as the intercom channel;
forwarding the call request to each floor distributor via the available cable; and
decoding and sending the call request to the indoor phone by at least one target floor distributor.

13. The intercom method according to claim 11, wherein the method further comprises switching the at least one of audio and video signals from the outdoor station to the available cable after identifying and assigning the available cable as the intercom channel.

14. The intercom method according to claim 11, wherein the method further comprises:
sending a call response to at least one target floor distributor if the indoor phone is available;
switching the at least one of audio and video signals from the available cable to the indoor phone by the at least one target floor distributor; and
forwarding the call response to the outdoor station via a building gateway.

15. The intercom method according to claim 11, wherein the method further comprises:
receiving a monitoring request from at least one of indoor phones via at least one target floor distributor by a building gateway;
identifying and assigning the available cable as the intercom channel; and
forwarding a monitoring request to the outdoor station.

16. The intercom method according to claim 15, wherein the method further comprises:
sending a monitoring response to the at least one target floor distributor if the outdoor station is available by the building gateway; and
switching the at least one of audio and video signals from the available cable to the outdoor station.

17. The door entry system according to claim 2, wherein the available cable comprises four twisted pairs, wherein the cable is at least one of a Category 5, a Category 5e, and a Category 6.

18. The door entry system according to claim 3, wherein the available cable comprises four twisted pairs, wherein the cable is at least one of a Category 5, a Category 5e, and a Category 6.

19. The door entry system according to claim 4, wherein the available cable comprises four twisted pairs, wherein the cable is at least one of a Category 5, a Category 5e, and a Category 6.

20. The door entry system according to claim 4, wherein the available cable comprises four twisted pairs, wherein the cable is at least one of a Category 5, a Category 5e, and a Category 6.

* * * * *